Oct. 10, 1961 D. V. PRENTICE ET AL 3,003,541
APPARATUS AND METHOD FOR FORMING ELONGATED SHEET FROM VENEER
Filed Nov. 4, 1957 3 Sheets-Sheet 1
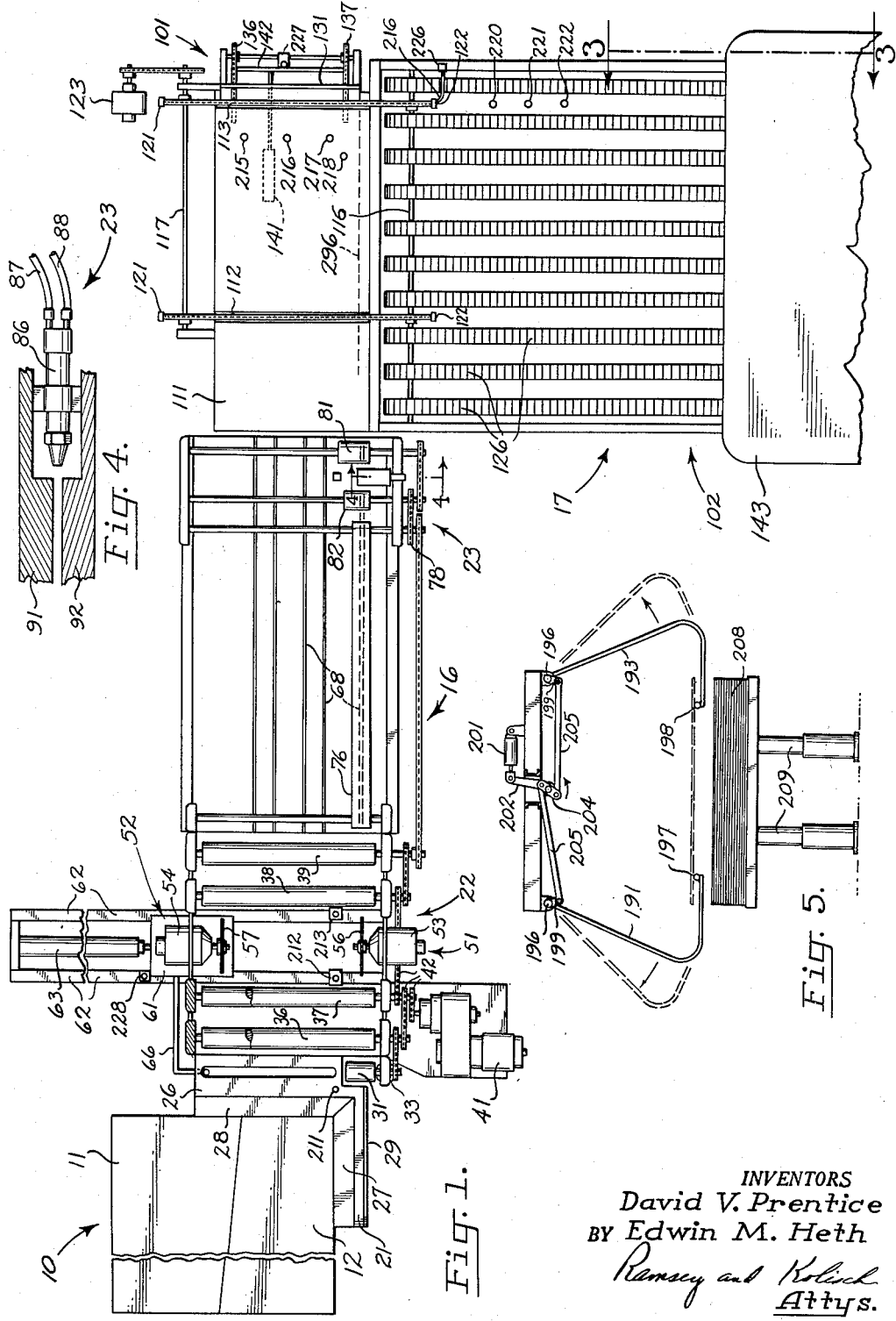
INVENTORS
David V. Prentice
BY Edwin M. Heth
Ramsey and Kolisch
Attys.

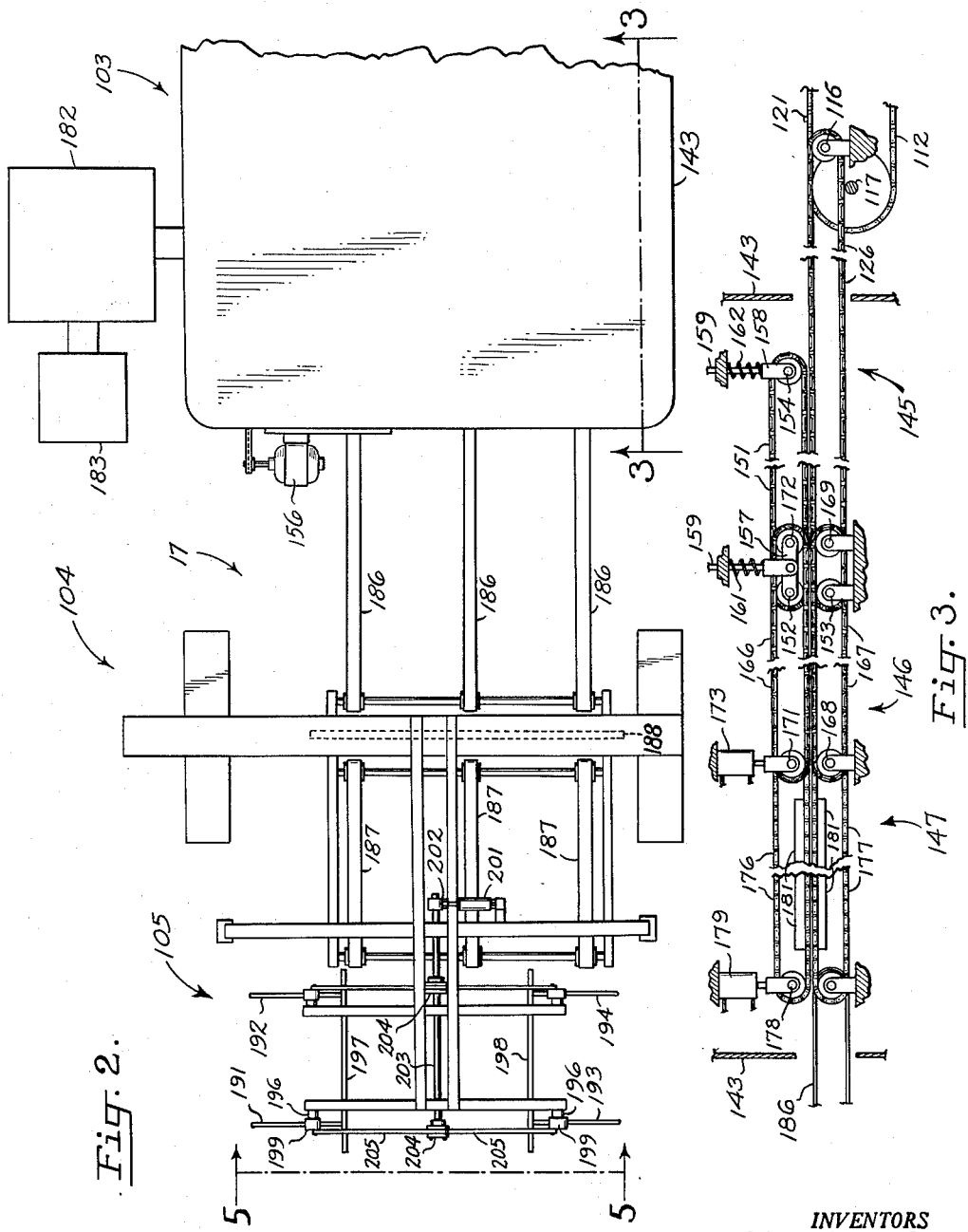

INVENTORS
David V. Prentice
BY Edwin M. Heth
Ramsey and Kolisch
Attys.

United States Patent Office 3,003,541
Patented Oct. 10, 1961

3,003,541
APPARATUS AND METHOD FOR FORMING ELONGATED SHEET FROM VENEER
David V. Prentice and Edwin M. Heth, Portland, Oreg., assignors to Prentice Machine Works, Inc., Portland, Oreg., a corporation of Oregon
Filed Nov. 4, 1957, Ser. No. 694,210
5 Claims. (Cl. 156—263)

This invention relates to the manufacture of plywood and a process for making elongated veneer sheet by consolidating veneer pieces into a continuous sheet. More particularly, this invention relates to method and apparatus for preparing elongated sheet from veneer pieces by edge bonding strips of veneer, and to a method for manufacturing plywood wherein the plywood core is preformed in strips of preselected length prior to manufacturing the plywood product.

Generally, it is an object of this invention to provide an improved method for producing elongated sheet by edge bonding strips of veneer which requires a minimum amount of supervision, and which may be performed at a high production rate.

A related object is to provide a method for producing elongated sheet which results in substantial reduction in the amount of material wasted in trimming the veneer pieces prior to their assembly into a continuous sheet.

Another general object is to provide an improved method for the manufacture of plywood which enables the economic production of plywood having a veneer core of superior qualities.

This invention features the production of elongated veneer pieces wherein opposite margins of the veneer pieces are first prepared by sending the veneer pieces one at a time in a direction corresponding to the direction of their grain through a cutting station which cuts parallel prepared edges along each sheet substantially along the grain of each sheet. The individual veneer pieces or sheets are cut selectively, so that the prepared edges of each sheet bound a sheet having a width determined by the initial dimension across the smaller of the two ends of the sheet. It should be understood that veneer pieces vary in size, some having a usuable width which is appreciably greater than others. Further, prior to trimming, the opposite longitudinal margins of a sheet are not always parallel. By selectively trimming each sheet individually, a substantial reduction in waste is realized.

After trimming, the sheets are transported as a series past an adhesive applicator. A coat of adhesive or glue is applied to a corresponding prepared edge of each sheet and the sheets then assembled by conveying the sheets in a direction normal to their prepared edges and crowding the sheets into edge-to-edge abutting relation. By conveying the sheets first generally in the direction of their grain, and then during crowding of the sheets in a direction transversely of their grain, manipulation of the sheets is materialy reduced. The veneer sheets remain as a series of sheets arranged in a single layer throughout the process.

The veneer pieces are transported during their processing through a continuous treating path having cutting, gluing, collecting and drying stations spaced therealong. The collecting station also functions as a place for crowding the individual veneer sheets into abutting relation prior to sending the series into the dryer. The feed of sheets into the cutting station is determined by the accumulation of sheets in the collecting station, and the feed of sheets from the collecting station into the dryer is also determined by the accumulation of sheets in the collecting station. A certain accumulation of sheets is reached in the collecting station before the sheets are fed from the station into the dryer to insure that separation between the sheets does not occur in the dryer. A larger accumulation of sheets functions to prevent the feed of new sheets into the cutting station.

In the manufacture of plywood, the preparation of a core layer for the plywood has produced in the past considerable difficulties. When the core is prepared by laying separate pieces of veneer over an underlying veneer lamina, gaps between the veneer sheets result, or overlapping edges often occur. Manufacturers have attempted preforming the core by taping different veneer pieces together, however, this procedure is disadvantageous since it requires an extra step, and further, tends to weaken the bond formed between the various plywood lamina. Also, a satisfactory edge-to-edge bond between the veneer pieces using this method is hard to obtain. This invention contemplates the manufacture of plywood from preformed core pieces of predetermined length, the core pieces being comprised of edge-to-edge bonded veneer strips which have been trimmed prior to their bonding to have parallel edges. The core pieces may be prepared by cutting the elongated sheet produced by this invention into pieces of predetermined length. Plywood may be manufactured in this manner with a minimum amount of waste, and with a superior type of core.

These and other objects, features and advantages are attained by the present invention, the invention being described hereinbelow in conjunction with the accompanying drawings, wherein:

FIG. 1 illustrates the infeed or forward end of a conveyor system, arranged with a cutting station, a gluing station and a collecting station spaced therealong;

FIG. 2 illustrates the outfeed or rear end of the conveyor system illustrated in FIG. 1 showing clipper and stacker mechanism present, FIG. 2 being an extension of the apparatus in FIG. 1, in a direction extending downwardly from the lower righthand side of FIG. 1;

FIG. 3 is a section view along the lines 3—3 in FIGS. 1 and 2, illustrating the conveyor mechanism in the collecting station;

FIG. 4 is a section view along the line 4—4 in FIG. 1 showing the adhesive applicator in the gluing station;

FIG. 5 is a view along the line 5—5 in FIG. 2, illustrating the stacker mechanisms employed for stacking pieces cut from the elongated sheet produced by the apparatus of this invention.

Figure 6:
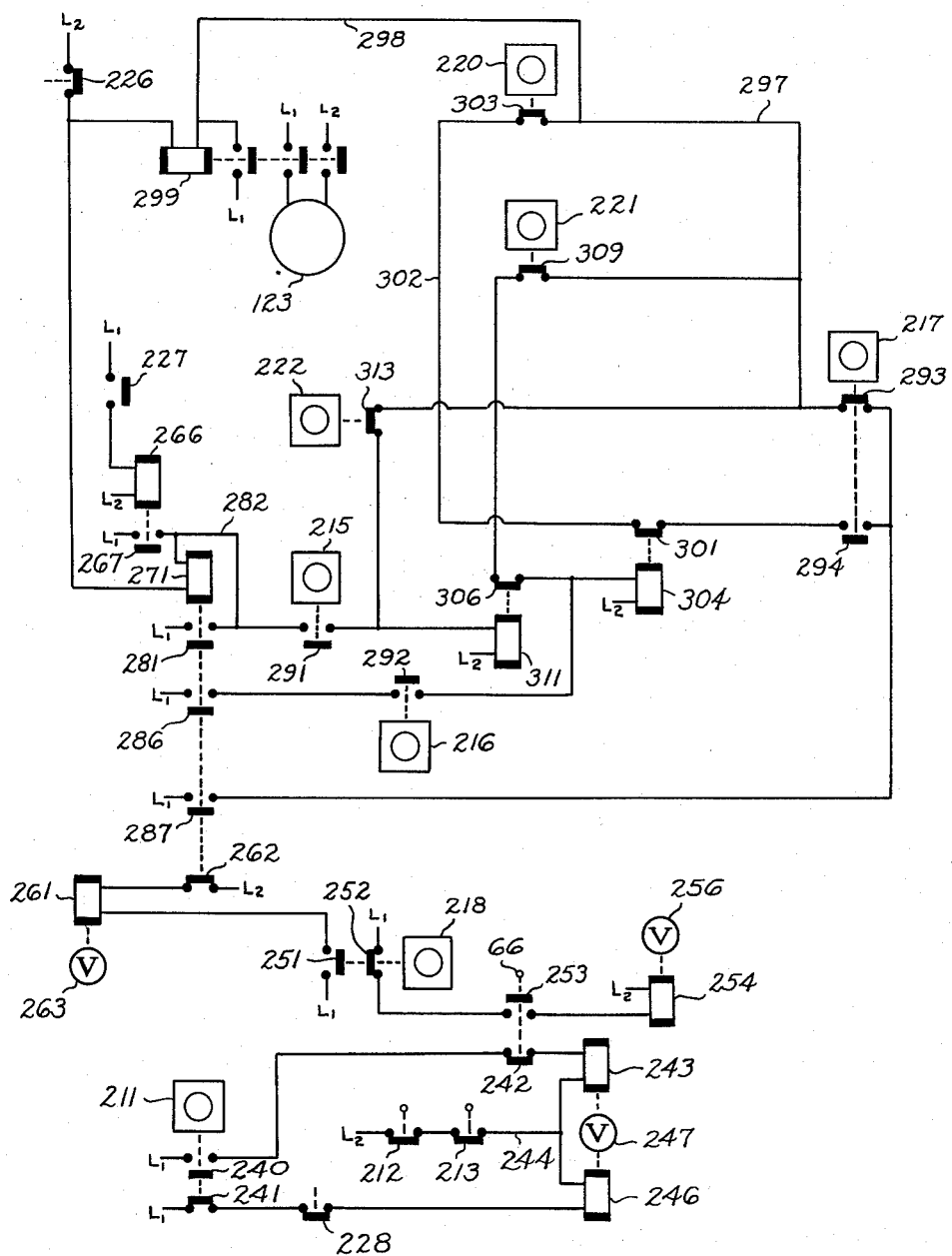
FIG. 6 is a schematic showing of a control circuit used for regulating the flow of veneer along the conveyor system.

Referring now to the drawings for a more detailed description of this invention, and more particularly to FIGS. 1 and 2, 10 indicates a stack of veneer pieces, such as veneer pieces 11 and 12, which are to be processed by the apparatus illustrated to form core pieces of predetermined length used in the manufacture of plywood.

The veneer pieces are conveyed along a conveyor system providing a continuous treating path. In the embodiment illustrated, the conveyor system is comprised of a pair of conveyor legs, with one conveyor leg being disposed perpendicular to the other conveyor leg. The conveyor legs are indicated generally in FIGS. 1 and 2 by the designations 16 and 17. The veneer pieces are treated by serially feeding single sheets in the direction of their grain into conveyor leg 16, which transports the sheets in the direction of their grain to conveyor leg 17. The sheets are then transported in a direction extending transversely of the grain of the sheets by conveyor leg 17 through a collecting station, a dryer, clipper mechanism, and thence to a stacker which stacks pieces cut by the clipper in an even pile.

Specifically, conveyor leg 16 has at its forward end a feed table 21. Rearwardly of feed table 21 is a cutting station 22, and a gluing station indicated at 23.

Feed table 21 has an L-shaped table surface 26. Bevel surface portions 27 and 28 slope downwardly from the top plane of table surface 26 and provide an incline for sliding veneer sheets from stack 10 onto table surface 26. A fence 29 along one side of the feed table aligns one margin of a veneer sheet prior to sending it through the apparatus.

Rotatably mounted behind fence 29 and disposed above the plane of the feed table is a power driven prefeed roller 31 which constitutes delivery mechanism feeding veneer sheets into the cutting station. Roller 31 is mounted in a slidable bearing mount so as to accommodate vertical adjustment of the position of the roller. A complementary support roller (hidden by roller 31) is rotatably mounted in a fixed position directly beneath prefeed roller 31 with upper portions of the roller approximately level with table surface 26. A motor, illustrated by the end of a double acting piston cylinder 33, is operable, when actuated, to move prefeed roller 31 downwardly against the support roller. This causes the two rollers to grab a veneer sheet and move it into conveyor leg 16 so as to initiate travel of the sheet through the conveyor leg.

Rearwardly of prefeed roller 31 are two pairs of feed rolls, indicated at 36 and 37, respectively. These feed rolls extend transversely across the infeed end of the conveyor leg. Each pair includes a top and a bottom roll, adapted to engage top and bottom surfaces of a veneer sheet thereby to transport the sheet through the apparatus. A similar pair of feed rolls 38 and 39 are located rearwardly in conveyor leg 16 behind cutting station 22.

Mechanism is included for rotating the prefeed and feed rolls, such as motor 41, and chains 42 which interconnect the motor with sprockets affixed to roll shafts for the rolls. In the embodiment illustrated, only the upper set of rolls are shown as driven rolls, the lower set of rolls rotating as idler rolls. Both upper and lower rolls may be driven if desired to provide for more positive transfer.

Cutting station 22 interposed between feed rolls 36, 37, and feed rolls 38, 39 has a fixed or stationary saw mechanism 51, and a laterally adjustable saw mechanism 52. Each saw mechanism includes a motor, indicated at 53 and 54, and a motor-driven saw blade, indicated at 56 and 57. Stationary saw mechanism 51 cuts a straight, prepared edge along the margin of a veneer sheet which has been positioned against fence 29. Adjustable saw mechanism 52 trims the opposite margin of a veneer sheet, and cuts a prepared edge which is substantially parallel to the edge produced by mechanism 51.

Adjustable saw mechanism 52 rests on platform 61 which slides over laterally arranged rails 62. Adjustment of the saw mechanism is brought about by actuating double-acting piston cylinder 63, having one end affixed to the frame and its other end secured to platform 61 supporting motor 54.

Veneer pieces fed into the apparatus in many instances do not have parallel edges or margins extending along their grain. Thus, a piece such as veneer piece 12, often has a quadrilateral outline with the margins on opposite sides of the piece lying at an angle with respect to each other. In practicing this invention, each sheet is fed into the apparatus with the smaller of the two ends of the sheet leading the sheet. Saw mechanism 52 is then adjusted so that saw 57 makes a cut along a line disposed slightly inwardly from the margin lying opposite the margin which was aligned with fence 29. A cut parallel to the cut produced by saw mechanism 51 is then produced. By feeding the veneer pieces serially, one at a time, and by cutting the sheets selectively, trimmed sheets of maximum width are produced, each sheet having a width determined by the initial dimension across the smaller of the two ends of the sheet.

In the apparatus shown, the adjustment of saw mechanism 52 is controlled by an elongated feeler 66. One end of the feeler is carried by platform 61, and controls a switch and valve regulating piston-cylinder 63. The other end of the feeler extends upwardly through a slot 67 in table 21. This other end protrudes above the table surface so as to engage a margin of a veneer piece placed in the path of the feeler.

A veneer piece passing down conveyor leg 16 moves longitudinally along the conveyor leg while supported on longitudinal rails 68. The rails terminate at the rear end of conveyor leg 16, where veneer pieces are deposited on conveyor leg 17 extending perpendicularly of or normal to conveyor leg 16. Veneer pieces are transported along rails 68 by a belt 76 moving over the veneer pieces and engaging the top surfaces of the pieces. The belt is driven by chains 78 so as to rotate simultaneously with the feed rolls.

Gluing station 23, which is to the rear of belt 76, has two sets of steadying rolls holding veneer pieces as they travel past the glue applicator in the station. The steadying rolls comprise a rear set of rolls 81 and a forward set of rolls 82. Each set of steadying rolls includes an upper and a lower roll, rotatably mounted in the frame, which engage top and bottom surfaces, respectively, of a veneer piece.

Referring to FIGS. 1 and 4, gluing station 23 includes an applicator nozzle 86 dispensing glue in the form of a spray. Nozzle 86 has an air pressure conduit 87 and a glue supply conduit 88. A veneer piece moving down conveyor leg 16 travels between upper and lower walls 91 and 92 when passing adjacent nozzle 86, which shield the top and bottom surfaces of the veneer from having glue deposited thereon.

In the usual instance it is necessary to apply adhesive to one edge only of a veneer piece. Adhesive is applied to a corresponding prepared edge of each sheet, such as the lower edge of each sheet, viewing the apparatus in FIG. 1. When a series of sheets are subsequently crowded together in edge-to-edge abutting relation with the prepared edges of one sheet abutting the prepared edges of adjacent sheets, a line of glue extends longitudinally along the joint between successive sheets.

Referring to FIGS. 1 and 2, conveyor leg 17 includes a feeder station 101, a collecting and crowding station 102, a drying station 103, a clipping station 104, and a stacking station 105. These are arranged one after another along the conveyor leg.

Feeder station 101 has a table surface 111, which supports a veneer piece prior to transfer into the collecting station. Extending across the table surface in suitable openings formed therein, and slightly below the top of the table surface, are a pair of transfer chains 112, 113. Each of the transfer chains engage sprockets mounted on shaft 116 and 117. The sprockets on shaft 116 rotate on the shaft, whereas the sprockets on shaft 117 are affixed to the shaft. The chains are revolved by rotation of shaft 117.

Each of the transfer chains includes a pair of lugs indicated at 121 and 122. Lugs 121 of the chains are in parallel alignment with lugs 122. The lugs of each chain are spaced on the chain so that when one lug lies over the sprocket supporting one end of the chain, the other lug lies over the sprocket supporting the other end of the chain. The lugs when traveling over table 111 protrude over the top of the table, and function to engage one of the prepared edges of a piece of veneer so as to deposit the veneer on a set of flat top chains 126 forming part of the collecting or crowding station. Thus the lugs and transfer chains constitute feed means for feeding the collecting station. A motor 123 chain connected to shaft 117 rotates chains 112, 113 to move the lugs across table 111.

Veneer pieces in traveling from conveyor leg 16 to conveyor leg 17 have their ends aligned on leg 17 by a chucker bar 131 disposed above the plane of table 111. The bar is shown in FIG. 1 in its forward position, or the position to which it moves in aligning the end of a piece of veneer on the table. The bar is movable to a retracted position back from this forward position, or to the right in FIG. 1. Bar 131 is affixed to a pair of continuous chains 136 and 137, which are each reeved about suitable sprockets supporting the ends of the chains. A cross bar 142 extending between chains 136, 137 is secured to lower portions of the chains. A double-acting piston-cyclinder 141, with its cylinder end secured to the frame and the rod for the piston-cylinder connected to a cross bar 142 provides a means for moving bar 131 between its forward and retracted positions. Extension of piston-cylinder 141 rotates the chains in a counter-clockwise direction viewing upwardly in FIG. 1 to move the chucker bar from its retracted to its forward position while contraction of piston-cylinder 141 returns the bar. The chucker bar receives a veneer sheet in its retracted position, the veneer piece being thrown against the bar by belt 68 and rebounding off the bar slightly upon striking the bar. When the bar is subsequently moved forwardly, the veneer piece is eased gradually into an end aligned position. If lugs 121 or lugs 122 are then moved across table 111, a veneer sheet deposited on the table will be moved by the lugs into parallel alignment with preceding pieces of veneer lying on the set of chains 126.

The set of flat top chains 126 constitute the initial portion of the crowding or collecting station of the apparatus. The chains of the set travel downwardly in FIG. 1 under a hood 143 which encloses the remainder of the collecting station as well as drying station 103.

Referring to FIG. 3, the conveyor system for the collecting station and drying station is comprised of three conveyor sections indicated generally at 145, 146, and 147, respectively. The chains in the set of chains 126 have superimposed over their rear ends a complementing series of flat top chains 151, and set of chains 126 and 151 make up conveyor section 145. The chains of conveyor section 145 are reeved at their forward and rear ends about sprockets mounted on shafts 152, 153, 154, and 116. The sprockets carried by shaft 152 and 153 are fixed to the shafts enabling the chains to be turned by rotating these shafts. The chains in chain sets 151 and 126 are turned in opposed directions at the same rate of speed so as to move veneer interposed between the chains from right to left in FIG. 3. Suitable power transmitting mechanism (not shown) and a motor 156 (see FIG. 2) turn shafts 152 and 153.

Shafts 153 and 116 mounting the chains of set 126 are supported by the frame of the apparatus in a vertically fixed position, whereas shafts 152 and 154 are movable up and down. In the embodiment illustrated, shafts 152 and 154 are supported at their ends by mounts 157, 158, respectively, which have secured thereto studs 159 movable vertically in the frame of the apparatus. Springs 161, 162 urge mounts 157, 158 downwardly in FIG. 3, thereby to provide a clamping pressure between the chains of chain sets 151, 126.

Conveyor section 146 located rearwardly of conveyor section 145 is comprised of a top and a bottom set of flat top crowder chains, indicated in FIG. 3 at 166 and 167, respectively. The chains of these sets complement each other, i.e., each chain in the upper set lies over a chain in the lower set. The chains are spaced laterally intermediate the chains in chain sets 126, 151. The bottom series of chains are reeved about sprockets mounted on shafts 168, 169 which are fixed against vertical movement as by mounting the shafts directly on the frame of the apparatus. The top set of chains are reeved about sprockets mounted on shafts 171, 172 which are vertically movable in the frame. In the embodiment illustrated, shaft 171 mounting the sprockets carrying the rear ends of the chains in chain set 166 is connected at each end to a piston-cylinder 173 and the vertical position of the shaft is regulated by actuation of the piston-cylinders. Shaft 172 mounting the sprockets carrying the other ends of these chains is supported at each end by a mount 157 discussed above.

The chains of chain sets 166 and 167 are rotated in opposed directions so as to transport veneer from right to left in FIG. 3. The chains are driven by rotating shafts 168, 171 which are fixed to the sprockets for the chains of these chain sets. Suitable power-transmitting mechanism (not shown) interposed between motor 156 and shafts 168, 171 transmits drive from the motor to these shafts. The chains of the chain sets are rotated at a slightly slower speed than the chains in chain sets 126, 151, and in this way veneer pieces are crowded together in edge-to-edge abutting relation upon entering conveyor section 146. Conveyor section 146 constitutes the end portion of the collecting or crowding station 102.

Rearwardly of section 146 are a top and bottom set of extended link chains, indicated at 176 and 177, making up conveyor section 147. The chains of the top set complement the chains of the bottom set, and the chains of each set are laterally spaced intermediate the chains in sets 166, 167. As in the case of conveyor section 146, the bottom set of chains are carried on sprockets mounted on shafts which are fixed against vertical movement, whereas the top set of chains may be moved up and down relative to the frame of the apparatus. Specifically, the sprockets engaging the forward ends of the chains in chain set 176 are mounted on vertically adjustable shaft 171 discussed in connection with section 146. The rear ends of the chains are reeved about sprockets mounted on a shaft 178. Shaft 178, like shaft 171, is vertically movable relative to the frame of the apparatus, and is connected at each end to a piston-cylinder 179, which, when actuated, regulates the vertical spacing of shaft 178.

The chains of conveyor section 147 transport veneer pieces through the drying station or dryer means of the apparatus, where the line of adhesive between adjacent sheets is dried. Various well-known types of dryers may be employed, such as calrod, or radio frequency type dryers. The specific form of dryer used is not material to an understanding of this invention. A radio-frequency-type dryer of a type such as may be employed in this invention is disclosed in U.S. Patent No. 2,705,993, issued April 12, 1955. In FIGS. 2 and 3, 181 indicates generally the electrodes for a radio-frequency dryer located in the area covered by chain sets 176, 177. The radio-frequency generator and blower for the generator are indicated at 182 and 183, respectively.

Rearwardly of conveyor section 147 is a series of belts 186 transporting the continuous sheet of veneer formed in the dryer to the clipping station 104. A second series of belts 187 (see FIG. 2) carries veneer pieces clipped by the veneer clipper at the clipping station to stacking station 105. The upper surfaces of belts 186, 187 transport veneer along a common horizontal plane.

Belts 186 and 187, and the extended link chains of chain sets 176 and 177 are carried on pulleys and sprockets which are freely rotatable on the shafts which support them. Movement of veneer rearwardly from the flat top chains of conveyor sections 145, 146 is produced entirely by the thrust exerted on veneer by the chains in conveyor sections 145, 146. In the absence of any veneer between the flat top chains of conveyor sections 145, 146, any veneer lying between the chains of conveyor section 147, or on belts 186, 187, remains stationary. As veneer sheets build up in edge-to-edge abutting relation between the crowder chains of section 146 and the top and bottom flat top chains of section 145, the frictional grab of the flat top chains in these conveyor sections builds up until a sufficient rearward thrust is created to urge veneer lying on the conveyor system rearwardly of sections 145, 146 past the veneer clipper and out the rear end of the apparatus. The clamping pressure of the complementing chains in sections 145, 146 is adjusted so that at some point between the condition wherein the chains of the sections are clear of veneer and the condition wherein veneer extends between the chains of the sections along their entire length, the thrust created by the chains is sufficient to push veneer rearwardly out of the apparatus. In this way veneer pieces are fed into the dryer, or between the sets of extended link chains in section 147, at a rate determined by the accumulation of sheets in the collecting or crowding station of the apparatus. This prevents separation of the sheets during drying, which is an important feature.

The veneer clipper of station 104 is conventional. Referring to FIG. 2, the clipper includes a blade indicated at 188 movable up and down against an anvil member disposed beneath the blade thereby to cut the continuous veneer sheet transported into the clipper into core pieces of predetermined length. Conventional mechanism regulated by the passage of veneer through the clipper times the actuation of the blade so that the blade makes a cutting pass at regular intervals determined by the length of veneer passing through the clipper. A veneer clipper and control mechanism such as may be employed in this invention is illustrated in U.S. Patent No. 2,758,649, issued August 14, 1956 to Anderson et al., entitled "Veneer Clipper."

Veneer pieces of predetermined length travel from the veneer clipper on belts 187 rearwardly to stacker station 105. Referring to FIGS. 2 and 5, the stacker of station 105 includes four arms 191 to 194, each having inwardly turned ends and each pivoted to the frame by a pivot connection 196. Rods 197 and 198 extend between the lower inner ends of the pair of arms on each side of the stacker, and are fixed to the arms. A crank lever 199 is secured to each of the arms. The arms are moved from an open position, shown by dotted lines in FIG. 5, to a closed position, shown by solid lines in FIG. 5, by a double-acting piston-cylinder 201. Piston-cylinder 201 is connected to the crank levers for the arms as by lever 202, shaft 203, pivot links 204, and bars 205. Veneer pieces transported from the veneer clipper on belts 187 are deposited on rods 197, 198 when the arms occupy their closed position. Opening of the arms by actuation of piston-cylinder 201 drops the veneer pieces upon a stack of veneer 208 held by an elevator mechanism 209.

Veneer pieces are fed into cutting station 22 at a rate determined by the accumulation of sheets in collecting station 102. Referring to FIG. 1, it will be noted that in front of slot 67 accommodating the end of feeler 66 is a photoelectric device indicated at 211, which functions as the start photoelectric device. In front and to the rear of the saws in the cutting station are a pair of interlock switches indicated by the outlines 212 and 213. Each is conventional, each having a finger depressed by veneer passing thereover so as to actuate the switch. Arranged at table 111 are four photoelectric devices, comprising a series of three feed photoelectric devices indicated at 215, 216, and 217, and an end aligning photoelectric device 218. Spaced along a line between the chains of chain set 126 is another series of three photoelectric devices numbered 220, 221, and 222. Finger 66 discussed above is connected to a switch controlling lateral positioning of saw mechanism 52. A feed limit switch 226 having a switch finger in the path of the lugs of chain 113, an edge line limit switch 227 having a switch finger engaged by cross bar 142 when the chucker bar is in its forward position, and a saw retract limit switch 228 having a switch finger engaged by platform 61 when the platform is retracted, complete the control elements actuated during the transport of a piece of veneer for regulating the flow of veneer through the apparatus.

The control circuit regulated by the various photoelectric devices and switch elements enumerated above is illustrated in FIG. 6. A majority of the wiring, control valves and electrical elements shown in FIG. 6 has been eliminated from the other figures in the drawing for the reason of clarity. It should be realized that the wiring and control elements of FIG. 6 are present in the remaining figures. The control circuit is illustrated diagrammatically in FIG. 6 to enable a better understanding of the various functions of the parts.

Each photoelectric device is a combination light sender and receiver. The photoelectric devices are mounted in the apparatus at the positions indicated in FIG. 1 above the path of the veneer as it is transported along the conveyor system. Light emitted from the photoelectric cell of each device is directed downwardly to shine against a mirror surface mounted below the path of the veneer through the conveyor system. When the mirror surface is uncovered, light is reflected by the mirror to the receiving portion of the device. Each photoelectric device has a relay which remains deenergized as long as sufficient light is transmitted to the receiving portion of the device. When the light is interrupted by a piece of veneer passing between the light sender and mirror surface, a thyratron in the device passes current which energizes the relay. The photoelectric devices are conventional, and are indicated in FIG. 6 for simplicity by a square outline encompassing a circle which designates the photoelectric cell for the device. The switches in the relay for each photoelectric device are shown. In FIG. 6, the position of the various switches illustrated is the position they occupy when the various relays controlling the switches are in their deenergized position.

Referring to FIG. 6, photoelectric device 211, the start photoelectric, controls a relay including a normally open switch 240 and a normally closed switch 241. Switch 240 connects a line conductor $L_1$ through a switch 242 ganged to feeler 66 and a solenoid 243 to a conductor 244. Normally closed switch 241 connects line conductor $L_1$ through the saw retract limit switch 228 and a solenoid 246 to conductor 244. Conductor 244 leads to saw interlock switches 212, 213 and a line conductor $L_2$. Solenoid 243 is ganged to a valve 247 regulating piston-cylinder 63 which laterally positions adjustable saw mechanism 52. Solenoid 246 is also ganged to valve 247. Solenoid 243 when energized adjusts valve 247 so as to cause piston-cylinder 63 to expand and saw mechanism 52 to move inwardly toward saw mechanism 51. Solenoid 246 when energized adjusts valve 247 to cause the saw mechanism to return to a laterally outer position. When neither solenoid is energized, valve 247 holds piston-cylinder 63 in a fixed position.

In operation, when photoelectric device 211 is energized by a piece of veneer passing under the device, switch 240 is closed and solenoid 243 energized causing the adjustable saw mechanism 51 to move inwardly until feeler 66 contacts the outer margin of the veneer which functions to open switch 242. This stops lateral movement of the adjustable saw mechanism. The veneer in passing through the cutting station actuates switches 212 and 213 to open the switches and fix the saw in position during the interval that the veneer piece is in the cutting station. When the veneer piece passes beyond photoelectric device 211, switch 240 opens and switch 241 closes, so that solenoid 246 becomes energized after the veneer passes the cutting station atnd interlock switches 212, 213 close. This causes the adjustable saw mechanism to move outwardly until the platform carrying the mechanism actuates retract limit switch 228 to open the switch. This results in solenoid 246 becoming deenergized, and holding of piston-cylinder device 63 in a fixed retracted position ready for the next piece of veneer.

Referring again to FIG. 6, the relay of end aligning photoelectric device 218 is ganged to a pair of switches indicated at 251 and 252. One of the switch contacts of switch 252 is connected to line conductor $L_1$ and the other of the switch contacts is connected through a switch 253 ganged to feeler 66 and a solenoid 254 to conductor L₂. Solenoid 254 is ganged to a valve 256 controlling piston-cylinder 33 and the vertical position of prefeed roller 31.

When table 111 is clear of veneer, the relay of photoelectric device 218 is deenergized, and switch 252 is closed. When feeler 66 contacts an edge of a piece of veneer in moving through slot 67, switch 253 closes. This causes energizing of solenoid 254 and adjustment of valve 256 to actuate piston-cylinder 33 so that prefeed roller 31 moves downwardly toward the roll disposed thereunder. When the prefeed roller 31 engages the top surface of a piece of veneer, the prefeed roller grabs the veneer and starts it moving through the apparatus.

The prefeed roller cannot initiate movement of a piece of veneer through the apparatus when veneer occupies table 111, since switch 252 opens whenever the light of the photoelectric device 218 is interrupted. Note also that the prefeed roller cannot start movement of a sheet until feeler 66 contacts the edges of a piece of veneer or until saw mechanism 51 is laterally adjusted, since feeler 66 is ganged to switch 253 connected in the circuit for solenoid 254. Prefeed roller 31 constitutes delivery mechanism feeding sheets into the cutting mechanism or station, and the roller is actuated in response to the accumulation of sheets on table 111, which is controlled by the accumulation in the collecting station as described below.

A veneer piece in traveling down conveyor leg 16 onto table 111 interrupts the light transmission to photoelectric device 218. This in addition to opening switch 252 closes switch 251. Switch 251 when closed connects conductor L₁ through a solenoid 261 and a normally closed switch 262 to conductor L₂. Solenoid 261 is ganged to a valve 263 which regulates piston-cylinder 141 and the chucker bar. When solenoid 261 is energized, valve 263 is adjusted to cause expansion of piston-cylinder 141. Conversely, deenergizing of solenoid 261 adjusts valve 263 so as to cause contraction of piston-cylinder 141.

Referring to the left-hand upper portion of FIG. 6, edge line limit switch 227 connects conductor L₁ through a solenoid 266 with conductor L₂. Switch 267 ganged to solenoid 266 connects conductor L₁ through a solenoid 271 to one of the switch contacts of feed limit switch 226. The other switch contact of switch 226 is connected to conductor L₂. As long as edge limit switch 227 is open, solenoids 266 and 271 remain deenergized, and switch 262 ganged to solenoid 271 remains closed. When a veneer piece on table 111 energizes the relay of photoelectric 218 to close switch 251, the chucker bar starts to move to its forward position, as a result of adjustment of valve 263. This continues until edge line limit switch 227 is closed by cross bar 142 striking the switch. This causes energizing of solenoids 266 and 271, opening of switch 262, and deenergizing of solenoid 261. As a consequence, valve 263 turns causing piston-cylinder 141 to return the chucker bar to its retracted position.

Feed photoelectric devices 215 through 217 acting with photoelectric devices 220 to 222 regulate the transport of veneer pieces onto the set of chains 126. The feed depends upon the width of a veneer piece which can be accommodated on the chains of chain set 126. In FIG. 1, motor 123 turning transfer chains 112 and 113 is only actuated at such times as a veneer piece carried on table 111 can be wholly deposited on chains 126.

Referring again to FIG. 6, a switch 281 is ganged to solenoid 271 which is closed by the solenoid when it is energized. Switch 281 connects conductor L₁ to a conductor 282 and one side of solenoid 271. The other side of solenoid 271, as mentioned above, is connected through feed limit switch 226 to conductor L₂. Conductor 282 and switch 281 function to hold solenoid 271 energized after energizing and deenergizing of solenoid 266 caused by advancement and retraction of the chucker bar. Solenoid 271 remains energized after movement of the chucker bar until feed limit switch 226 is opened, which occurs after motor 123 is actuated and a set of lugs, either lugs 121 or 122, has moved across table 111 to deposit a sheet on chains 126 and strike switch 226.

Solenoid 271 is also ganged to normally open switches 286 and 287. Switch 286 connects conductor L₁ with a switch 292 of the relay of photoelectric device 216. Switch 287 connects conductor L₁ with a pair of switches 293 and 294 of the relay of photoelectric device 217. Switch 281 connects conductor L₁ with a switch 291 of the relay of photoelectric 215.

It will be understood, with reference to FIG. 1, that veneer deposited on table 111 has one edge extending generally along the dotted line 296, the edge having been aligned by fence 29, and its other edge spaced laterally some distance outwardly therefrom. If the veneer piece is of such a narrow width that the light of none of the photoelectric devices 217, 216, or 215 is interrupted, then motor 123 is actuated immediately after the veneer is edge aligned by chucker bar 131. With reference to FIG. 6, switch 293 of photoelectric 217 is normally closed, and if photoelectric 217, the closest photoelectric to line 296 in FIG. 1, remains deenergized, conductors 297 and 298 complete a circuit from conductor L₁, switch 287, and switch 293 to a solenoid 299, feed limit switch 226 and conductor L₂. Solenoid 299 is the starter solenoid for motor 123, and functions when energized to close the contacts for motor 123. After actuation of the motor, the motor runs until either a lug 121 or a lug 122 strikes feed limit switch 226, to open the switch and cause solenoids 271 and 299 to become deenergized.

If a veneer piece on table 111 is wide enough to intercept the light photoelectric device 217 only, then switch 293 opens and switch 294 closes. Solenoid 299 and motor 123 are actuated only if photoelectric device 220 signals that there is room for a piece of veneer of this width on chain set 126, which occurs if there is no interruption of the light of photoelectric 220 and its relay is deenergized.

Referring again to FIG. 6, switch 294 of photoelectric 217, when closed, connects conductor L₁ and switch 287 through a hold-out switch 301 and a conductor 302 to a switch 303 of the relay in photoelectric device 220. The other side of switch 303 is connected through conductor 298 to starter solenoid 299. Holdout switch 301 is regulated by photoelectric device 216 of table 111, and is operable if device 216 is actuated to prevent photoelectrics 217 and 220 from controlling the feed to chains 126. If photoelectric 217 only is actuated, starter solenoid 299 is energized if there is no veneer obstructing the light of photoelectric device 220, and the relay in the device remains deenergized so as to complete circuit to solenoid 299.

If a piece of veneer deposited on table 111 is of sufficient width to intercept the light of both photoelectric devices 216 and 217, then each of the relays in these devices are energized. Referring to FIG. 6, switch 292 of the relay in photoelectric device 216 when closed connects conductor L₁ and switch 286 through a solenoid 304 ganged to switch 301 to conductor L₂. Energizing of photoelectric 216 thus actuates hold-out switch 301. Switch 292 also connects conductor L₁ and switch 286 through a hold-out switch 306 to a switch 309 of photoelectric 221, which is connected to conductor 297. Hold-out switch 306 is regulated by photoelectric 215, and is operable if device 215 is actuated to prevent photoelectrics 216, 221 from controlling the feed to chains 126. If photoelectrics 216 and 217 only are actuated, switch 306 is closed, and starter solenoid 299 and motor 123 are actuated when the light of photoelectric 221 is unobstructed, causing switch 309 of the photoelectric to be closed and a complete circuit for solenoid 299.

With a still wider piece of veneer, photoelectric 215 in conjunction with photoelectric 222 control operation. In FIG. 6, switch 291 of photoelectric 215 connects conductor $L_1$ and switch 281 with solenoid 311 ganged to hold-out switch 306, and conductor $L_2$. A piece of veneer wide enough to cover photoelectric 215 deposited on table 111 causes photoelectrics 215 and 216 both to become actuated and an energizing of both hold-out solenoids 304, 311. Switch 291 of photoelectric 215 also connects conductor $L_1$ and switch 281 to a switch 313 of photoelectric 222. The other side of switch 313 is connected to conductor 297. Starter solenoid 299 becomes energized to start motor 123 if photoelectric 222 is deenergized and switch 313 closed, to make a closed circuit between conductor 297 and conductor $L_1$.

The operation and method of this invention is as follows: A veneer piece is first moved manually from the stack of veneer 10 onto table 21 in front of prefeed roll 31. Obstructing the light of start photoelectric 211 initiates lateral adjustment of saw mechanism 51. The saw moves inwardly to ready itself for a cut along the veneer margin disposed away from fence 29. Movement of the saw stops when feeler 66 strikes the edge of the veneer. If photoelectric 218 signals that table 111 is clear, the prefeed roller then moves downwardly to grab the veneer and start it through the apparatus. The sheets are fed serially one at a time in the direction of their grain into the apparatus.

Each veneer piece passes through the cutting station where parallel prepared edges are made in the veneer piece. Continued forward movement of the veneer piece passes the piece through the gluing station where a coat of adhesive is applied to the corresponding edge of each piece. The veneer pieces are deposited one at a time on table 111, where they are ready to be fed into the collecting station of conveyor leg 17. The veneer pieces are transported in a direction extending transversely of their grain into the collecting station.

The veneer pieces are fed by chains 112, 113 into the collecting station at a rate which depends upon the accumulation of sheets in the station. Photoelectrics 215, 216, and 217, and photoelectrics 220, 221, and 222 regulate the transfer from table 111 to the collecting station. Since the presence or absence of a sheet on table 111 controls actuation of the prefeed roller, these photoelectric devices also comprise means regulating the prefeed roller in response to the accumulation of sheets in the collecting station.

From the flat top chains of conveyor 145, the veneer pieces are transported first into conveyor section 146 and thence through the dryer. The veneer pieces are crowded together in edge-to-edge abutting relation in crowding section 146. As mentioned hereinabove, the feed rearwardly from the crowder chains is determined by the accumulation of sheets between the chains of sections 145 and 146. The chains of these sections and the construction whereby they are mounted in the apparatus so as to produce a clamping pressure sufficient to move veneer out the rear end of the apparatus comprise a control mechanism regulating the feed of veneer past the dryer at a rate determined by the accumulation of sheets in the collecting station.

The process of this invention has numerous advantages. It permits a single man to perform an operation which previously required a considerable number more. Maximum use is made of each veneer piece processed. There is very little manual handling of the veneer pieces, the veneer pieces after being cut with parallel prepared edges traveling on a continuous path until they reach the stacking station.

Plywood may be prepared using the veneer segments of predetermined length cut by the clipper as core pieces. In the manufacture of three plyboard, for instance, the core piece is superimposed over a suitable veneer sheet having a coating of the appropriate adhesive thereon. Another veneer sheet coated with adhesive may then be laid over the core piece, and the assembled sheets heated under pressure in the usual manner to complete the plyboard product.

The core of plywood manufactured in this manner is composed of edge-to-edge bonded veneer pieces. Cracks or overlapped edges in the core are eliminated. The core piece is characterized by a high degree of strength, since the veneer pieces making up the core are crowded together with glue intermediate their prepared edges and then dried prior to manufacture of the core. The veneer pieces are assembled together in the core without the use of tape or other attaching means extending over the faces of the pieces.

While there has been described one embodiment of this invention, modifications and variations are possible without departing from the inventive concept thereof. It is desired not to be limited to the specific embodiment illustrated, but to cover all modifications and variations which would be apparent to one skilled in the art and that come within the scope of the appended claims.

It is claimed and desired to secure by Letters Patent:

1. A continuous process of manufacturing elongated pieces from veneer pieces by transporting the sheets through a continuous treating path having work stations spaced therealong which comprises serially feeding single pieces of veneer into a veneer cutting station at one end of said treating path, cutting each piece in the cutting station along opposite margins of the pieces to form a pair of substantially parallel prepared edges, transporting the pieces as a series of single pieces through a gluing station and applying in the gluing station adhesive along a corresponding prepared edge of each piece in the series, conveying the pieces to a collecting station and assembling the pieces at this collecting station in edge-to-edge abutting relation with one of the parallel prepared edges of one piece abutting one of the parallel edges of an adjacent piece, and feeding the pieces from this collecting station at a rate determined by the accumulation of pieces in the collecting station into a drying station and drying the adhesive between the assembled pieces to form an elongated sheet comprised of edge bonded parallel strips of veneer.

2. A continuous process of manufacturing elongated sheet from veneer pieces by transporting the pieces through a continuous treating path having work stations spaced therealong which comprises serially feeding single pieces of veneer into a veneer cutting station at one end of said treating path, cutting each piece in the cutting station along opposite margins of the piece to form a pair of substantially parallel prepared edges, transporting the pieces as a series of single pieces through a gluing station and applying in the gluing station adhesive along a corresponding prepared edge of each piece in the series, conveying the pieces to a collecting station and assembling the pieces at the collecting station in edge-to-edge abutting relation with one of the parallel prepared edges of one piece abutting one of the parallel prepared edges of an adjacent piece, the feeding of pieces into the cutting station being determined by the accumulation of pieces in the collecting station, and feeding the pieces from the collecting station into a drying station and drying the adhesive between the assembled pieces to form an elongated sheet comprised of edge bonded parallel strips of veneer.

3. A continuous process of manufacturing elongated sheet from veneer pieces by transporting the pieces through a continuous treating path having work stations spaced therealong which comprises serially feeding single pieces of veneer into a veneer cutting station at one end of said treating path, cutting each piece, selectively, in the cutting station to form a piece bounded by a pair of parallel prepared edges, the prepared edges of each piece being selectively cut so that the edges bound a piece having a width determined by the initial dimension across the smaller of the two ends of the piece, transporting the pieces as a series of single piece through a gluing station and applying in the gluing station adhesive along a corresponding prepared edge of each piece in the series, conveying the pieces to a collecting station and assembling the pieces at the collecting station in edge-to-edge abutting relation with one of the parallel prepared edges of one piece abutting one of the parallel prepared edges of an adjacent piece, the feeding of pieces into the cutting station being determined by the accumulation of pieces in the collecting station, and feeding the pieces from the collecting station at a rate determined by the accumulation of pieces in the collecting station into a curing station and drying the adhesive between the assembled pieces to form an elongated sheet comprised of edge bonded parallel strips of veneer.

4. Apparatus for manufacturing elongated sheet from veneer pieces comprising an elongated conveyor system for transporting veneer pieces in series along a treating path; a cutting mechanism placed at the forward end of said conveyor system; said cutting mechanism having a pair of laterally spaced power-driven cutting elements mounted in the path for the veneer pieces operable to trim opposite margins of the pieces to produce parallel prepared edges, and means for adjusting the lateral spacing of said cutter elements; delivery mechanism feeding veneer pieces into said cutting mechanism; an adhesive applicator positioned rearwardly of said cutting mechanism mounted adjacent the path for the veneer pieces operable to deposit adhesive along one of the prepared edges of the veneer pieces; said conveyor system including collecting means rearwardly of said applicator for crowding veneer pieces transported on said conveyor system into edge-to-edge abutting relation with the prepared edges of the pieces abutting each other and feed means for feeding the collecting means; drying means mounted adjacent said conveyor system rearwardly of said collecting means for drying adhesive deposited on the edges of the pieces; and control means for operably connected to said delivery mechanism and said feed means for regulating their actuation; said control means actuating said feed means to cause veneer pieces to be fed to said collecting means in response to the accumulation of pieces in said collecting means and actuating said delivery mechanism to cause feeding of pieces into said cutting mechanism in response to the accumulation of pieces in said collecting means.

5. Apparatus for manufacturing elongated sheet from veneer pieces, comprising an elongated horizontally disposed conveyor system for transporting veneer pieces as a series of single pieces along a treating path, said conveyor system having a first conveyor leg and a second conveyor leg disposed normally of the first and with the feed end of the second conveyor leg adjacent the discharge end of the first conveyor leg and constructed and arranged whereby said second conveyor leg transports veneer pieces laterally of the discharge end of said first conveyor leg, delivery means for feeding veneer pieces into the feed end of said first conveyor leg, cutting mechanism adjacent the path of veneer pieces traveling over said first conveyor leg for trimming edges paralleling the path of travel of the pieces therealong, adhesive applicator means towards the discharge end of said first conveyor leg from said cutting mechanism for applying adhesive to trimmed edges of veneer pieces, said second conveyor leg including an intermittently operated section adjacent the feed end thereof operable at intervals to initiate the movement of pieces therealong, dryer means adjacent the path of travel of pieces over said second conveyor leg toward the discharge end of the leg from said intermittently operated section, and control means regulating said delivery means and said intermittently operated section, said control means being operatively connected to the two whereby actuation of said delivery means is in response to the accumulation of pieces on said second conveyor leg and actuation of said intermittently operated section is in response to the accumulation of pieces on said second conveyor leg.

References Cited in the file of this patent

UNITED STATES PATENTS

| | | |
|---|---|---|
| 2,021,348 | Beckwith | Nov. 19, 1935 |
| 2,378,244 | Pfenning | June 12, 1945 |
| 2,562,728 | Melby | July 31, 1951 |
| 2,572,772 | Skoog | Oct. 23, 1951 |
| 2,644,496 | Schubert | July 7, 1953 |
| 2,657,160 | Croston | Oct. 27, 1953 |
| 2,691,995 | Carlson | Oct. 19, 1954 |
| 2,821,221 | Jacquier | Jan. 28, 1958 |